United States Patent Office 3,830,810
Patented Aug. 20, 1974

3,830,810
s-TRIAZINE DERIVATIVES
Dagmar Berrer, Riehen, Manfred Kühne, Pfeffingen, and Christian Vogel, Binningen, Switzerland, assignors to Ciba-Geigy Corporation, Ardsley, N.Y.
No Drawing. Filed Nov. 29, 1972, Ser. No. 310,506
Claims priority, application Switzerland, Dec. 1, 1971, 17,459/71
Int. Cl. C07d 55/20
U.S. Cl. 260—249.8        3 Claims

ABSTRACT OF THE DISCLOSURE

Triazine derivatives of formula I

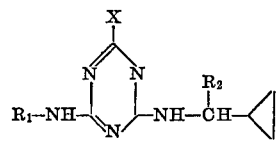

(I)

wherein

X represents chlorine, the methoxy, the methylthio or the azido group,
$R_1$ represents hydrogen, a *lower* alkyl, alkoxyalkyl, cyanoalkyl or cyclopropyl-alkyl radical, or the cyclopropyl radical, or an alkinyl group having 3–4 carbon atoms, and
$R_2$ represents hydrogen, or an alkyl radical having 1 to 3 carbon atoms, including the cyclopropyl group, can be used as weedkiller in plant crops.

---

The present invention relates to s-triazine derivatives, to processes for their production, to the use of the new triazines for the control of weeds and wild grasses, also to herbicidal agents, as well as to processes for the control of weeds and wild grasses by application of the new s-triazine derivatives or of corresponding agents.

An appreciable number of triazines have already become known as herbicidal active substances which, by virtue of their pronounced herbicidal effectiveness, can be used for the control of weeds in crops of the most diverse kind. Thus, for example, several representative compounds from the series of 2-chloro-, 2-methoxy- and 2-methylthio - 4,6-bis(subst. alkylamino)-s-triazines have assumed great importance for the selective control of weeds in grain, maize and fodder crops. More recently, there have also become known triazine derivatives having cyanoalkylamino and cyclopropylamino groups (e.g. U.S.A. Pat. No. 3,451,802, French Pat. No. 1,536,479 and Belgian Pat. No. 730,135), the said triazine derivatives having with regard to their action and selectivity in various crops of cultivated plants undoubted advantages, but being with regard to selectivity in the case of certain cultivated plants not fully satisfactory, or displaying undesirable deficiencies in their sphere of action against weeds associated with the said cultivated plants. This is frequently the case with regard to, in particular, weeds in varieties of grain, in rice, soya bean, sorghum, cotton crops, etc.

The aim of the research on which the present invention is based was therefore the development of herbicidal active substances which have a good and, as far as possible, complete herbicidal action against the weed flora growing among the various cultivated plants, whilst preserving to the maximum extent the cultivated plants concerned.

It has now been established that substituted diamino-s-triazine derivatives of formula I

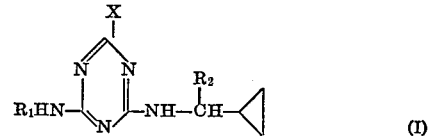

(I)

satisfy these requirements. The symbols in formula I have the following meanings:

X represents chlorine, the methoxy, the methylthio or the azido group,
$R_1$ represents hydrogen, a *lower* alkyl, alkoxyalkyl, cyanoalkyl or cyclopropyl-alkyl radical or the cyclopropyl radical, or an alkinyl group having 3–4 carbon atoms, and
$R_2$ represents hydrogen, or an alkyl radical having 1 to 3 carbon atoms, including the cyclopropyl group.

Suitable lower alkyl radicals denoted by $R_1$ in formula I, separately or as constituents of alkoxyalkyl, cyanoalkyl and cyclopropyl-alkyl radicals, are such ones having 1 to 4 carbon atoms in a straight chain or as branched groups, such as methyl, ethyl, n-propyl, isopropyl, and the four isomeric butyl radicals. The preferred cyanoalkyl radical $R_1$ is

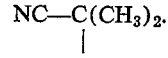

The new s-triazine derivatives of formula I are produced according to the invention, by conventional methods, from cyanuric chloride. This is effected by the successive replacement of 2 chlorine atoms by the amino radicals according to formula I, and, optionally, also by the replacement of the third chlorine atom by the methoxy, methylthio or azido group, this occurring in any desired sequence.

It is naturally also possible to start with mono- or dichlorotriazine derivatives which already contain one of the two substituted amino groups and/or a radical X different from chlorine, and to replace one or two of the remaining chlorine atoms by the corresponding amino group.

The following examples indicate the extent of the range of possible variants of the process.

(1) Reaction of a cyanuric halide, particularly cyanuric chloride, with an amine of formula II

(II)

and with a cyclopropyl-methylamine of formula III

(III), in any desired sequence, in a solevnt or diluent such as hydrocarbons, ketones, ethers (dioxane), etc., and in the presence of an acid-binding agent; the first stage (with the first amine) is performed at temperatures of below 30° C., preferably between −15° and 0°, and the second amination at temperatures of between 0° and 45°.

There is obtained in this manner a final product of formula I wherein X represents halogen, e.g. chlorine, and the remaining final chlorine atom can be optionally replaced, in a manner known per se, by the methoxy, methylthio or azido group.

The replacement of this last chlorine atom by the methoxy group is effected in a known manner by reaction with an alkali metal methanolate, especially sodium methanolate, refluxing being carried out (12–24 hours) until the reaction is completed; or by heating of a solution of the stated 2-chlorotriazine in a methanolic solution of the double molar amount of a condensation agent such as trimethylamine.

The exchange of the chlorine atom for the methylthio radical is performed by a process in which aqueous trimethylamine solution is added to a suspension of the corresponding 2-chlorotriazine in a diluent, e.g. in acetone/water, and the mixture subsequently stirred until a clear solution is formed; the double molar amount of methylmercaptan is then introduced, the whole stirred at room temperature, and the obtained oil processed. The replacement of the chlorine atom can also be effected by the addition of the corresponding 2-chloro-s-triazine to an alcoholic or alcoholic-aqueous solution of the alkali metal mercaptide, and the refluxing of the resulting mixture until it shows a neutral reaction.

A further possibility with respect to the replacement of the chlorine atom by the methylthio radical is the reaction of 2-chloro-4,6-bis-amino-s-triazine with thiourea, alkaline saponification of the intermediate (thiuronium salt) to the intermediate stage, wherein X represents an —SNa group, and methylation on the sulphur atom, e.g. with dimethylsulphate.

The replacement of the chlorine atom by the azido group can be performed by a method in which, for example, aqueous trimethylamine solution is added to a suspension of the corresponding 2-chloro-4,6-bis-amino-s-triazine in a diluent, e.g. acetone/water, and stirring continued until a clear solution is obtained; an alkali metal azide is then added, the whole stirred at room temperature, and the final product processed.

(2) Triazine derivatives of formula I wherein X represents a methoxy or methylthio radical may also be obtained by commencing with corresponding 2,4-dichloro-6-methoxy- or 6-methylthio-s-triazines, reacting these with an amine of formula II or a salt thereof in the presence of an acid-binding agent, and producing according to the invention from the obtained products, with a cyclopropyl methyl-amine of formula III in the presence of an acid-binding agent, 2-methoxy- and 2-methylthio-s-triazine derivatives. In principle, however, the sequence of introduction of the substituents can be selected as desired.

If $R_1$ is a cyanoalkyl group, then most of the corresponding amino-nitrile starting materials of formula II and their salts are known, and only in some cases new and not yet described in the literature. They are produced, for example, by the method of Strecker, whereby a ketone is treated in ether with ammonium chloride and aqueous sodium cyanide solution. In the processing of the ether extracts, the hydrochloride of the desired amino-nitrile is preferably precipitated immediately by introduction of HCl gas.

Suitable solvents or diluents for the reactions of amines of formulae II and III or their salts with cyanuric chloride or with a 2,4-dichloro-monoamino-s-triazine are water, aliphatic and aromatic hydrocarbons and halogenated hydrocarbons, ethers and ethereal compounds, nitriles, amides, ketones, etc., as well as mixtures of such solvents with each other and with water, preferably toluene/water mixtures.

The same applies for the reaction of a 2,4-dichloro-6-methylthio-s-triazine with an amine of formula III.

Applicable as acid-binding agents for these reactions are inorganic bases such as alkali metal and alkaline-earth metal hydroxides or -carbonates, or tertiary amines such as trialkylamines, pyridine and pyridine bases. Preference is to be given, however, to inorganic bases, particularly to alkali metal hydroxides such as NaOH.

The reactions of the first amine with cyanuric chloride are performed in the temperature range of from —30° to +30° C., preferably between —15 and 0° C., and their duration, depending on the chosen temperature, is from a few minutes to 10 hours. The reaction of the intermediate with the second amine is carried out at temperatures of between 0 and 50° C., and can take up to 3 days.

The azido group can be introduced by reaction with an alkali metal azide in the presence of a basic substance. Suitable basic substances are preferably tertiary amines such as trialkylamines, but also hydroxides, oxides and carbonates of alkali and alkaline-earth metals. Preferably water is used as solvent or diluent for the reaction; other solvents can however be employed, such as, e.g. those mentioned above.

The new s-triazines of formula I wherein X represents the azido group can also be obtained by the reaction of a hydrazino-s-triazine of formula IV:

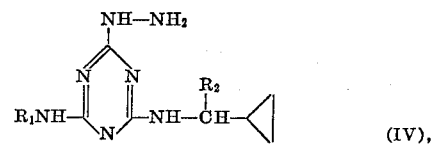

wherein $R_1$ and $R_2$ have the meanings given under formula I, with nitrous acid or with an alkali metal nitrite.

The hydrazino-s-triazines of formula IV are obtained by reaction of the corresponding chloro-s-triazines of formula I with hydrazine or hydrazinechlorohydrate.

The process according to the invention for the production of the new active substances of formula I is illustrated by the following examples. The term "parts" denotes parts by weight, and temperatures are expressed in degrees centigrade.

EXAMPLE 1

An amount of 280 g. of cyanuric chloride is stirred with 2000 ml. of toluene, and an addition then made at —5 to —10° of 185 g. of 1-cyclopropyl-ethylamine hydrochloride in solid form. There is then added dropwise at —5 to —10°, with stirring, 121 g. of sodium hydroxide dissolved in 600 ml. of water, and stirring continued at this temperature until the mixture shows a neutral reaction. A dropwise addition is then made at +5 to +10°, with stirring, of 263 ml. of a 52% aqueous ethylamine solution, and stirring continued at room temperature until again a neutral reaction is obtained. The aqueous phase is then separated and, after washing with toluene, discarded. The combined toluene phases are dried and the solvent distilled off. The solid white residue remaining is recrystallised from cyclohexane. The thus obtained pure 2-chloro - 4 - ethylamino-6-(1'-cyclopropyl-ethylamino)-s-triazine melts at 122–124° [=compound 1].

EXAMPLE 2

8.5 g. of 2-chloro-4-ethylamino-6-(1'-cyclopropyl-ethylamino)-s-triazine obtained according to Ex. 1 is taken up in 100 ml. of a mixture of equal parts of acetone and water; and addition is made of 8.8 g. of a 40% aqueous solution of trimethylamine, and stirring continued until a clear solution is obtained. There is then introduced 3.4 g. of methylmercaptan, the mixture further stirred overnight, and then filtered. The filtrate is concentrated by evaporation until the major part of the acetone has been removed. Ether is added to the remainder, and the aqueous layer separated. The ethereal solution is dried and concentrated by evaporation. On cooling of the solution, 2-methylthio-4-ethylamino - 6 - (1' - cyclopropyl-ethylamino)-s-triazine crystallises out. It can be recrystallised from ether, and afterwards has the melting point 74–75° [=compound 2].

EXAMPLE 3

A solution of 15.1 g. of cyclopropyl-methylamine in 40 ml. of benzene is added at room temperature to 43.1 g. of 2,6-dichloro-4-isopropylamino-s-triazine dissolved in 250 ml. of benzene. There is then added to the mixture 27.8 g. of sodium hydroxide as a 30% aqueous solution, and the whole stirred for 12 hours at room temperature.

The formed precipitate is separated and washed with water until neutral. The thus obtained 2-chloro-4-isopropylamino-6-(cyclopropylmethyl)amino-s-triazine has the M.P. 139–141° [compound 7].

EXAMPLE 4

An amount of 20.85 g. of 2-chloroisopropylamino-6-(cyclopropylmethyl)amino-s-triazine (obtained according to Example 3) is dissolved in 100 ml. of absolute methanol, and 3.75 g. of sodium hydroxide then added. The solution is subsequently refluxed for 18 hours and, after removal by distillation of ca. 50 ml. of methanol, poured into water, and the obtained precipitate dried. The thus obtained 2-methoxy - 4 - isopropylamino-6-(cyclopropylmethyl)amino-s-triazine has, after recrystallisation from hexane, the melting point 103–105° [=compound 8].

EXAMPLE 5

An amount of 72 ml. of 15% aqueous hydrochloric acid and 8.55 g. of thiourea are added to 20.85 g. of 2-chloro - 4 - isopropylamino-6-(cyclopropylmethyl)amino-s-triazine. The initially clear solution becomes pasty after three hours' stirring at room temperature. To the reaction mixture are then added 76.6 g. of 30% sodium hydroxide solution, 36 ml. of water and 12 g. of dimethylsulphate, and the whole subsequently extracted with ethyl acetate. The ethyl acetate is then distilled off, the residue taken up in benzene, and the solution purified. From this there is obtained the compound 2-methylthio-4-isopropylamino-6-(cyclopropylmethyl)amino-s-triazine, M.P. 77–82° [=compound 9].

The s-triazine derivative of formula I

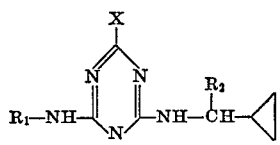

described in the preceding examples, as well as further such s-triazine derivatives, are listed in the following table.

| No. | X | R₁ | R₂ | Melting point or other constant |
|---|---|---|---|---|
| 1 | Cl | $C_2H_5$ | $CH_3$ | 122–124° |
| 2 | $CH_3S$ | $C_2H_5$ | $CH_3$ | 74–75° |
| 3 | Cl | $C_2H_5$ | Cyclopropyl | 131–132° |
| 4 | $CH_3S$ | $C_2H_5$ | do | 44–45° |
| 5 | Cl | Cyclopropyl | do | 143–145° |
| 6 | Cl | do | $CH_3$ | 131–133° |
| 7 | Cl | Iso-$C_3H_7$ | H | 139–141° |
| 8 | $CH_3O$ | Iso-$C_3H_7$ | H | 103–105° |
| 9 | $CH_3S$ | Iso-$C_3H_7$ | H | 77–82° |
| 10 | Cl | Iso-$C_3H_7$ | $CH_3$ | 187–188° |
| 11 | Cl | Iso-$C_3H_7$ | Cyclopropyl | 185–186° |
| 12 | Cl | H | H | |
| 13 | $CH_3O$ | H | H | |
| 14 | $CH_3S$ | H | H | |
| 15 | Cl | H | $CH_3$ | 58–60° |
| 16 | $CH_3O$ | H | $CH_3$ | (¹) |
| 17 | $CH_3S$ | H | $CH_3$ | $n_D^{45}$ 1.5948 |
| 18 | $N_3$ | H | $CH_3$ | 50–55° |
| 19 | Cl | $CH_3$ | H | 214–217° |
| 20 | $CH_3O$ | $CH_3$ | H | 87–88° |
| 21 | $CH_3S$ | $CH_3$ | H | 82–87° |
| 22 | $N_3$ | $CH_3$ | H | |
| 23 | Cl | $CH_3$ | $CH_3$ | 118–120° |
| 24 | $CH_3O$ | $CH_3$ | $CH_3$ | 94–96° |
| 25 | $CH_3S$ | $CH_3$ | $CH_3$ | 90–94° |
| 26 | $N_3$ | $CH_3$ | $CH_3$ | 112–115° |
| 27 | Cl | $C_2H_5$ | H | 202–203° |
| 28 | $CH_3O$ | $C_2H_5$ | H | |
| 29 | $CH_3S$ | $C_2H_5$ | H | |
| 30 | $N_3$ | $C_2H_5$ | H | |
| 31 | CN | $C_2H_5$ | H | |
| 32 | $CH_3O$ | $C_2H_5$ | $CH_3$ | |
| 33 | $N_3$ | $C_2H_5$ | $CH_3$ | |
| 34 | CN | $C_2H_5$ | $CH_3$ | |
| 35 | Cl | $C_2H_5$ | $C_2H_5$ | |
| 36 | $CH_3O$ | $C_2H_5$ | $C_2H_5$ | |
| 37 | $CH_3S$ | $C_2H_5$ | $C_2H_5$ | |
| 38 | $N_3$ | $C_2H_5$ | $C_2H_5$ | |
| 39 | Cl | $C_2H_5$ | Iso-$C_3H_7$ | |
| 40 | $CH_3O$ | $C_2H_5$ | Iso-$C_3H_7$ | |
| 41 | $CH_3S$ | $C_2H_5$ | Iso-$C_3H_7$ | |
| 42 | $N_3$ | $C_2H_5$ | Iso-$C_3H_7$ | |
| 43 | $CH_3O$ | Iso-$C_3H_7$ | $CH_3$ | |
| 44 | $CH_3S$ | Iso-$C_3H_7$ | $CH_3$ | 78–81° |

TABLE—Continued

| No. | X | R₁ | R₂ | Melting point or other constant |
|---|---|---|---|---|
| 45 | $N_3$ | Iso-$C_3H_7$ | $CH_3$ | |
| 46 | Cl | Sec. $C_4H_9$ | H | |
| 47 | $CH_3O$ | Sec. $C_4H_9$ | H | |
| 48 | $CH_3S$ | Sec. $C_4H_9$ | H | |
| 49 | $N_3$ | Sec. $C_4H_9$ | H | |
| 50 | Cl | ▷—CH—<br>\|<br>$CH_3$ | $CH_3$ | 167–170° |
| 51 | $CH_3O$ | Same as above | $CH_3$ | 89–95° |
| 52 | $CH_3S$ | do | $CH_3$ | 82–85° |
| 53 | $N_3$ | do | $CH_3$ | 65–74° |
| 54 | Cl | $CH_3O(CH_2)_3$— | H | |
| 55 | $CH_3O$ | $CH_3O(CH_2)_3$— | H | |
| 56 | $CH_3S$ | $CH_3O(CH_2)_3$— | H | |
| 57 | Cl | $CH_3$—O—$(CH_2)_3$— | $CH_3$ | 68–70° |
| 58 | $CH_3O$ | $CH_3O(CH_2)_3$— | $CH_3$ | $n_D^{45}$ 1.5230 |
| 59 | $CH_3S$ | $CH_3O(CH_2)_3$— | $CH_3$ | |
| 60 | Cl | NC—C($CH_3$)$_2$<br>\| | H | |
| 61 | Cl | Same as above | $CH_3$ | |
| 62 | $CH_3O$ | do | $CH_3$ | |
| 63 | $CH_3S$ | do | $CH_3$ | |
| 64 | $CH_3S$ | Cyclopropyl | $CH_3$ | $n_D^{60}$ 1.5720 |
| 65 | $N_3$ | $CH_3$—O$(CH_2)_3$— | $CH_3$ | $n_D^{45}$ 1.5458 |
| 66 | $CH_3S$ | HC≡C—CH—<br>\|<br>$CH_3$ | H | |

¹ Boiling point (0.001) 138–141°.

The new active substances of the general formula I are soluble in the usual organic solvents, and are stable to heat.

The starting amines of formula II are known substances, and likewise some cyclopropyl-methylamines of formula III, such as, e.g. 1-cyclopropyl-ethylamine (J. Am. Soc., 88, pp. 2262–2271), and the cyclopropyl-methylamine. Other not previously known starting amines of formula III, corresponding to the ones given above, can be easily produced in an analogous manner.

The new substituted diamino-s-triazine derivatives of formula I possess excellent herbicidal properties, and are particularly suitable for the control of gramineous and broad-leaved weeds in various cultivated crops. Applied in high concentrations, the new compounds act as total herbicides; in low concentrations, on the other hand, they act as selective herbicides. Annual and perennial types of weeds which are deep-rooted and difficult to control are destroyed or damaged in growth with a high degree of success by the active substances of formula I. Application of the new active substances can be effected, with the same high level of success, before emergence (per-emergence) and after emergence (post-emergence). Field weeds such as, e.g. millet varieties (Panicum sp.), mustard varieties (Sinapis sp.), goosefoot varieties (Chenopodiaceae), slender foxtail varieties, e.g. Amaranthus sp., grasses, e.g. Lolium sp., compositae, e.g. Taraxacum sp., and wild chamomile varieties (Matricaria sp.) are thus destroyed or inhibited in growth without damage being caused to useful plants, such as grain, maize, cotton, sorghum, rice and soya bean, etc. The applied amounts vary and are dependent on the time of application; they are between 0.1 and 10 kg. of active substance per hectare; in the case of application before emergence of the plants, the amount is up to 4 kg. of active susbtance per hectare, and after emergence of the plants the amount is 1 to 5 kg. of active substance per hectare. For total destruction, however, of the whole weed crop, e.g. on fallow land, it is necessary to apply more than 10 kg. of active substance per hectare. The operation of the normal crop rotation is not impaired in consequence of application of the new active substances.

The herbicidal action of the triazine derivatives according to the invention is illustrated by the following tests:

(1) Herbicidal action with application of the active substances before emergence of the plants (pre-emergence application)

Directly after the sowing of the test plants in seed trays, the active susbtances are applied as aqueous suspensions (obtained from a 25% wettable powder) to the surface of the soil in the trays. The seed trays are then maintained at 22–25° C. with 50–70% relative humidity, the test results being evaluated after 28 days.

The following test plants are used:

Cultivated plants: oats, wheat, maize, sorghum, rice and cotton.
Weeds: *Lolium multiflorum, Poa trivialis, Alopecurus myosuroides, Digitaria sanguinalis, Setaria italica, Echinochloa crus galli, Amaranthus spez., Chrysanthemum leuc., Sinapis alba, Ipomeo purpurea.*

The respective applied amounts in this test are given in the following table. Evaluation is made on the basis of the following scale of values:

9=plants undamaged (as control)
1=plants dead
2–8=intermediate stages of damage.

Herbicidal agents according to the invention are produced in a manner known per se by the intimate mixing and grinding of active substances of the general formula I with suitable carriers, optionally with the addition of dispersing agents or solvents which are inert to the active substances. The active substances can be obtained and used in the following forms:

solid preparations: dust, scattering agents, granulates (coated granulates, impregnated granulates and homogeneous granulates);
water-dispersible concentrates of the active substance:
liquid preparations: solutions.

The solid preparations (dusts, scattering agents, granulates) are produced by the mixing of the active substances with solid carriers. Suitable carriers are, e.g. kaolin, talcum, bole, loess, chalk, limestone, ground limestone, Attaclay, dolomite, diatomaceous earth, precipitated silicic acid, alkaline-earth silicates, sodium and potassium aluminium silicates (feldspar and mica), calcium and magnesium sulphates, magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extractions, active charcoal, etc., alone or in admixture with each other.

| Active substance number | Kg. per hectare | Lolium | Poa trivialis | Alopecurus | Digitaria | Setaria | Echinochloa | Amaranthus | Chrysanthemum | Sinapis | Ipomea | Oats | Wheat | Maize | Sorghum | Rice (dry) | Cotton |
|---|---|---|---|---|---|---|---|---|---|---|---|---|---|---|---|---|---|
| 1 | 0.5 | 1 | 1 | 2 | | | 5 | 1 | | 2 | | | | | 9 | 9 | | 9 |
| | 1 | 1 | 1 | 1 | | | 3 | 1 | | 1 | 1 | | | | 9 | 9 | | 8 |
| 6 | 0.5 | 1 | 1 | 2 | | | 3 | 1 | | 3 | | | | | 9 | 9 | | 9 |
| | 1 | 1 | 1 | 2 | | | 2 | 1 | | 1 | 2 | | | | 9 | 9 | | 7 |
| 8 | 0.5 | | | 2 | 1 | 2 | 2 | 1 | | 2 | 1 | | 5 | | 8 | | | 9 |
| | 1 | 3 | | 1 | 1 | 1 | 1 | 1 | 2 | 1 | 1 | | | | 7 | | | 9 |
| 9 | 0.5 | | | 1 | 1 | 2 | 1 | 1 | | | 9 | | 7 | | 8 | 7 | 9 | 9 |
| | 1 | 2 | | 1 | 1 | 1 | 1 | 1 | | 1 | | | 6 | | 8 | | 8 | 8 |
| 15 | 0.5 | 3 | | 2 | | | 3 | 1 | 2 | 2 | 1 | | | | 9 | 9 | | |
| | 1 | 2 | | 1 | | | 3 | 1 | 1 | 1 | 1 | | | | 9 | 9 | | |
| 25 | 0.5 | 2 | | 2 | 1 | 1 | 1 | 1 | | | | 9 | | | 9 | | | 9 |
| | 1 | 1 | | 1 | 1 | 1 | 1 | 1 | | | | 7 | | | 8 | | | 9 |
| 26 | | | | | | | | | | | | | 8 | 7 | 8 | 8 | 8 | 8 |
| | 1 | | | 2 | 2 | 3 | 3 | 2 | 2 | 2 | 1 | | | | | | | |
| 64 | 0.5 | 2 | | 1 | 1 | 1 | 1 | 1 | | | | | | | 9 | 8 | | 9 |
| | 1 | 1 | | 1 | 1 | 1 | 1 | 1 | | | | | | | 8 | 7 | | 9 |

(2) Herbicidal action with application of the active substances after emergence of the plants (post-emergence application)

The cultivated plants and weeds listed below are sprayed in the 4- to 6-leaf stage with an aqueous active-substance emulsion (obtained from a 25% emulsifiable concentrate), the applied amounts being 0.5 and 1 kg. of active substance per hectare. The plants are then kept at 24 to 26° C. with 45–60% relative humidity. The results of the test are evaluated 14 days after the treatment.

Cultivated plants: maize, wheat, sorghum.
Weeds: *Lolium perenne, Alopecurus myos., Digitaria sanguin, Setaria italica, Echinochloa crus galli, Sesbania exeltata, Sinapis alba, Ipomea purpurea, Matricaria chamomilla, Galium aparine, Pastinaca setiva.*

The particle size of the carriers is for dusts advantageously up to about 0.1 mm.; for scattering agents from about 0.075 mm. to 0.2 mm.; and for granulates 0.2 mm. or coarser.

The concentrations of active substance in the solid preparation forms are from 0.5 to 80%.

To these mixtures may also be added additives stabilising the active substance, and/or non-ionic, anion-active, and cation-active substances, which, for example, improve the adhesiveness of the active substances on plants and on parts of plants (adhesives and agglutinants), and/or ensure a better wettability (wetting agents) and dispersibility (dispersing agents). Suitable adhesives are, for example, the following: olein/chalk mixture, cellulose derivatives (methyl cellulose, carboxymethyl cellulose), hydroxyethylene glycol ethers of monoalkyl and

| Active substance number | Kg. AS per hectare | Lolium | Alopecurus | Digitaria | Setaria | Echinochloa | Sesbania | Sinapis | Ipomoea | Matricaria | Galium | Pastinaca | Sorghum | Wheat | Maize |
|---|---|---|---|---|---|---|---|---|---|---|---|---|---|---|---|
| 2 | 0.5 | 2 | 1 | 1 | 1 | 1 | | 1 | | 1 | 2 | | | 9 | 9 |
| | 1 | 1 | 1 | 1 | 1 | 1 | | 1 | | 1 | 1 | | | 9 | 8 |
| 15 | 0.5 | 2 | 2 | | | 2 | | 1 | 1 | 2 | 3 | 2 | 9 | | 9 |
| | 1 | 2 | 2 | | | 2 | | 1 | 1 | 2 | 2 | 2 | 8 | | 8 |
| 25 | 0.5 | 2 | 1 | 2 | 2 | 2 | | 3 | 2 | 2 | | 2 | 8 | 9 | 9 |
| | 1 | 1 | 2 | 1 | 1 | 1 | | 2 | 1 | 2 | | 2 | 7 | 8 | 8 |
| 65 | 0.5 | 2 | 2 | 2 | 3 | 3 | 2 | 1 | 2 | 1 | 2 | 2 | | | 7 |
| | 1 | 2 | 2 | 2 | 2 | 2 | 2 | 1 | 1 | 1 | 2 | 2 | | | 8 | dialkyl phenols having 5 to 15 ethylene oxide radicals per molecule and 8 to 9 carbon atoms in the alkyl radical, ligninsulphonic acids, their alkali metal and alkaline-earth metal salts, polyethylene glycol ethers (Carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e. wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents. The concentration of active substance in these agents is 5 to 80%.

The wettable powders and the pastes are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkali-metal and alkaline-earth metal salts.

Suitable anti-foam agents are, for example, silicones.

The active substances are so mixed, ground, sieved and strained with the above-mentioned additives that the solid constituent in the case of wettable powders has a particle size not exceeding 0.02 to 0.04 mm., and in the case of pastes not exceeding 0.03 mm. Dispersing agents such as those mentioned in the preciding paragraphs, organic solvents and water are used in the preparation of emulsion concentrates and pastes. Suitable solvents are, e.g. the following: alcohols, benzene, xylenes, toluene, dimethylsulphoxide, and mineral oil fractions boiling in the range of 120 to 350°. The solvents must be practically odourless, non-phytotoxic, inert to the active substances, and not readily inflammable.

Furthermore, the agents according to the invention can be used in the form of solutions. For this purpose the active substance (or several active substances) of the general formula I is (or are) dissolved in suitable organic solvents, in mixtures of solvents or in water. As organic solvents it is possible to use aliphatic and aromatic hydrocarbons, their chlorinated derivatives, alkylnaphthalenes, mineral oils on their own or in admixture with each other. The solutions should contain the active substance in a concentration of from 1 to 20%.

Other biocidal active substances may be added to the described agents according to the invention. For the widening of their sphere of action, the new agents may also contain, in addition to the stated compounds of the general formula I, e.g. insecticides, fungicides, bactericides, fungistatics, bacteriostatics or nematocides. The agents according to the invention can also contain fertilisers, trace elements, etc.

Preparations of the new active substances of the general formula I are described in the following. The term "parts" denotes parts by weight.

Granulate

The following substances are used for the preparation of a 5% granulate:

| | Parts |
|---|---|
| 2-chloro-4-ethylamino - 6 - bis(cyclopropyl)-methylamino-s-triazine | 5.0 |
| Epichlorohydrin | 0.25 |
| Cetyl polyglycol ether | 0.25 |
| Polyethylene glycol | 3.50 |
| Kaolin (particle size 0.3 to 0.8 mm.) | 91.00 |

The active substance is mixed with epichlorohydrin, and the mixture dissolved in 6 parts of acetone; polyethylene glycol and cetyl polyglycol ether are then added. The thus obtained solution is sprayed on kaolin, and subsequently evaporated off in vacuo.

Wettable powder

The following constituents are used for the preparation of (a) a 50%; (b) a 25%; and (c) a 10% wettable powder:

(a)

| | Parts |
|---|---|
| 2-methylthio-4-ethylamino - 6 - (1'-cyclopropyl-ethylamino)-s-triazine | 50 |
| Sodium dibutylnaphthyl sulphonate | 5 |
| Naphthalenesulphonic acid/phenol-sulphonic acid/formaldehyde condensate 3:2:1 | 3 |
| Kaolin | 20 |
| Champagne chalk | 22 |

(b)

| | Parts |
|---|---|
| 2 - chloro - 4 - isopropylamino - 6 - cyclopropylmethylamino-s-triazine | 25 |
| Sodium salt of oleylmethyl tauride | 5 |
| Naphthalenesulphonic acid/formaldehyde condensate | 2.5 |
| Carboxymethyl cellulose | 0.5 |
| Neutral potassium aluminium silicate | 5 |
| Kaolin | 62 |

(c)

| | Parts |
|---|---|
| 2-methylthio - 4 - isopropylamino - 6 - cyclopropylmethylamino-s-triazine | 10 |
| Mixture of the sodium salts of saturated fatty alcohol sulphates | 3 |
| Naphthalenesulphonic acid/formaldehyde condensate | 5 |
| Kaolin | 82 |

The given active substance is absorbed onto the appropriate carriers (kaolin and chalk), and the whole subsequently mixed and ground. Wettable powders having excellent wettability and suspension properties are thus obtained. Suspensions of any desired concentration of active substance can be prepared from the said wettable powders by dilution with water. Such suspensions are employed for the control of weeds and wild grasses in cultivated crops.

Paste

The following substances are used for the preparation of a 45% paste:

| | Parts |
|---|---|
| 2-methylthio - 4 - ethylamino - 6 - bis-(cyclopropyl)-methylamino-s-triazine | 45 |
| Sodium aluminium silicate | 5 |
| Cetyl polyglycol ether having 8 moles of ethylene oxide | 14 |
| Oleyl polyglycol ether having 5 moles of ethylene oxide | 1 |
| Spindle oil | 2 |
| Polyethylene glycol | 10 |
| Water | 23 |

The active substance is intimately mixed and ground, in suitable devices, with the additives. A paste is thus obtained from which can be prepared, by dilution with water, suspensions of any desired concentration. The suspensions are suitable for the treatment of vegetable crops.

Emulsion concentrate

The following constituents are mixed together for the preparation of a 25% emulsion concentrate:

|  | Parts |
|---|---|
| 2-methoxy - 4 - isopropylamino - 6 - cyclopropylmethylamino-s-triazine | 25 |
| Mixture of nonylphenolpolyoxyethylene and calcium dodecylbenzene sulphonate ("Emullat P 140 HFP") | 5 |
| Isophorone (3,5,5-trimethyl-2-cyclohexen-1-one) | 35 |
| Dimethylformamide | 35 |

This concentrate can be diluted with water to obtain emulsions of suitable concentration. Such emulsions are suitable for the control of weeds in cultivated crops, such as, e.g. cotton, maize, wheat, oats, rye, sorghum or rice.

What we claim is:

1. A compound of formula I

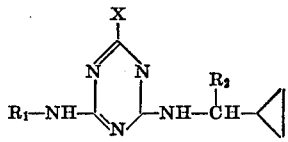
(I)

wherein
- X represents chlorine, the methoxy, the methylthio or the azido group,
- $R_1$ represents hydrogen, a lower alkyl, alkoxyalkyl, cyanoalkyl or cyclopropyl-alkyl radicals each having 1 to 4 carbon atoms in the alkyl group thereof, or the cyclopropyl radical, or an alkinyl group having 3 to 4 carbon atoms, and
- $R_2$ represents hydrogen, or an alkyl radical having 1 to 3 carbon atoms, or the cyclopropyl group.

2. The compound 2-methylthio-4-ethylamino-6-(1'-cyclopropyl-ethylamino)-s-triazine according to Claim 1.

3. The compound 2 - methylthio-4-isopropylamino-6-(cyclopropylmethyl)amino - s - triazine according to Claim 1.

References Cited

UNITED STATES PATENTS 3,629,256   12/1971   Berrer et al. _____ 260—249.8

JOHN M. FORD, Primary Examiner

U.S. Cl. X.R.

71—93; 260—249.6